US007860651B2

(12) United States Patent
Morgan et al.

(10) Patent No.: US 7,860,651 B2
(45) Date of Patent: Dec. 28, 2010

(54) ENHANCED INERTIAL SYSTEM PERFORMANCE

(75) Inventors: Kenneth S. Morgan, St. Petersburg, FL (US); Helen V. Younskevicius, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 1520 days.

(21) Appl. No.: 11/215,762

(22) Filed: Aug. 30, 2005

(65) Prior Publication Data

US 2007/0050138 A1    Mar. 1, 2007

(51) Int. Cl.
*G01C 21/00*    (2006.01)

(52) U.S. Cl. .................... 701/220; 701/70; 701/207; 701/214; 342/357.04; 342/357.14; 73/1.38; 73/178 R; 73/510; 73/512; 73/514.01

(58) Field of Classification Search ............. 701/21, 701/70, 220, 145, 207, 214; 342/357.04, 342/357.14; 73/178 R, 1.38, 510, 512, 514.01
See application file for complete search history.

(56) References Cited

U.S. PATENT DOCUMENTS 5,184,304 A * 2/1993 Huddle ..................... 701/220
6,243,657 B1 * 6/2001 Tuck et al. ................. 702/150
6,298,316 B1 * 10/2001 Diesel ....................... 702/190
6,459,990 B1 * 10/2002 McCall et al. ............. 701/220
6,516,021 B1 * 2/2003 Abbott et al. ............... 375/150
6,721,657 B2 * 4/2004 Ford et al. ................. 701/213
7,158,866 B2 * 1/2007 Gustafsson et al. ........... 701/1
2002/0111717 A1 * 8/2002 Scherzinger et al. .......... 701/1
2002/0198656 A1 * 12/2002 Ford et al. ................. 701/213
2004/0243344 A1 * 12/2004 Kronhamn et al. ......... 702/182
2005/0125141 A1 * 6/2005 Bye .......................... 701/200
2006/0100781 A1 * 5/2006 Lin et al. ................... 701/216

FOREIGN PATENT DOCUMENTS

EP    0276663    8/1988
WO    2005062984    7/2005

* cited by examiner

*Primary Examiner*—Khoi Tran
*Assistant Examiner*—Jorge O Peche
(74) *Attorney, Agent, or Firm*—Fogg & Powers LLC (57) ABSTRACT

An inertial system is provided. The system includes at least one inertial sensor, a processing unit and a plurality of Kalman filters implemented in the processing unit. The Kalman filters receive information from the at least one inertial sensor, and at most one of the plurality of Kalman filters has processed zero velocity updates on the last cycle. The plurality of Kalman filters is used to optimize system response and performance during periods of intermittent motion.

14 Claims, 5 Drawing Sheets

ENHANCED INERTIAL SYSTEM PERFORMANCE

TECHNICAL FIELD

The present invention relates generally to inertial systems and in particular to the use of Kalman filters to improve inertial systems.

BACKGROUND

Some inertial measurement systems are used to determine the attitude and propagate the position of an object on the ground. This is done by utilizing inertial sensors which measure rate information of the object relative to an inertial frame of reference. An inertial frame of reference is constant with respect to inertial space. Non-inertial frames of reference, such as an earth fixed frame, rotate and possibly translate with respect to an inertial frame. An example of an inertial sensor is an accelerometer which measures the change of velocity with respect to an inertial frame. Inertial sensors can be used by an inertial measurement system to realize 3-dimensional coordinates for the position of the object. To increase the accuracy of the coordinates, only the components of the body-sensed measurements which are relative to the actual motion of the vehicle are measured, and earth rotation, vibrations, and other random errors are eliminated.

Kalman filters are used by systems such as an inertial measurement system to estimate the state of a system from measurements, such as those from inertial sensors. Inertial sensor measurements are integrated up and contain random errors that the Kalman filter estimates in order to determine the attitude of the object. The accuracy of the position determined by an inertial system is dependent on processing zero velocity updates (ZUPTS). ZUPTS are measurements made by inertial sensors while the vehicle is stopped to ensure the accuracy of the position of the vehicle. ZUPTS are accurate only when the vehicle is stopped. When the vehicle moves, processing an observation to the Kalman filter that assumes the vehicle is stopped causes an error in the inertial measurement system. Detection of motion that would enable the system to avoid erroneous ZUPTS often occurs after the motion has started.

Techniques of detecting motion generally involve the use of a threshold. Unfortunately, in order to detect the motion as soon as possible the threshold level is reduced to a degree where vibrations, and not actual movement, have caused the threshold to be exceeded. Also, these techniques detect motion after it is started and allow erroneous ZUPTS to be processed.

For the reasons stated above and for other reasons stated below which will become apparent to those skilled in the art upon reading and understanding the present specification, there is a need in the art for a method of removing possible errors caused by incorrect zero velocity updates processed by Kalman filters.

SUMMARY

To be completed after inventor approval of the claims.

The above-mentioned problems and other problems are resolved by the present invention and will be understood by reading and studying the following specification.

BRIEF DESCRIPTION OF THE DRAWINGS

The present invention can be more easily understood and further advantages and uses thereof more readily apparent, when considered in view of the description of the preferred embodiments and the following figures in which.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention include an inertial system with improved accuracy by having a plurality of Kalman filters. The plurality of Kalman filters includes one that has processed zero velocity updates (ZUPTS) on the last cycle and at least one that has not processed ZUPTS on the last cycle but has processed ZUPTS on at least one previous cycle. When motion is detected, the inertial system can revert back to the solution maintained by a Kalman filter that has not processed ZUPTS on the last cycle (or has not processed ZUPTS on multiple cycles), thereby removing bad observations due to ZUPTS processed when the vehicle was in motion.

In another embodiment, the method of detecting motion using the multiple Kalman filters is enhanced. This is done by using a solution separation algorithm which is beneficial for detecting motion in slow moving objects. This technique overcomes problems with conventional threshold motion detection algorithms as applied to, for example, slow moving objects.

In another embodiment, a vehicle incorporating an inertial system with a plurality of Kalman filters is provided. The vehicle includes a guidance system and a position controller than moves the vehicle to the proper position.

Figure 1:
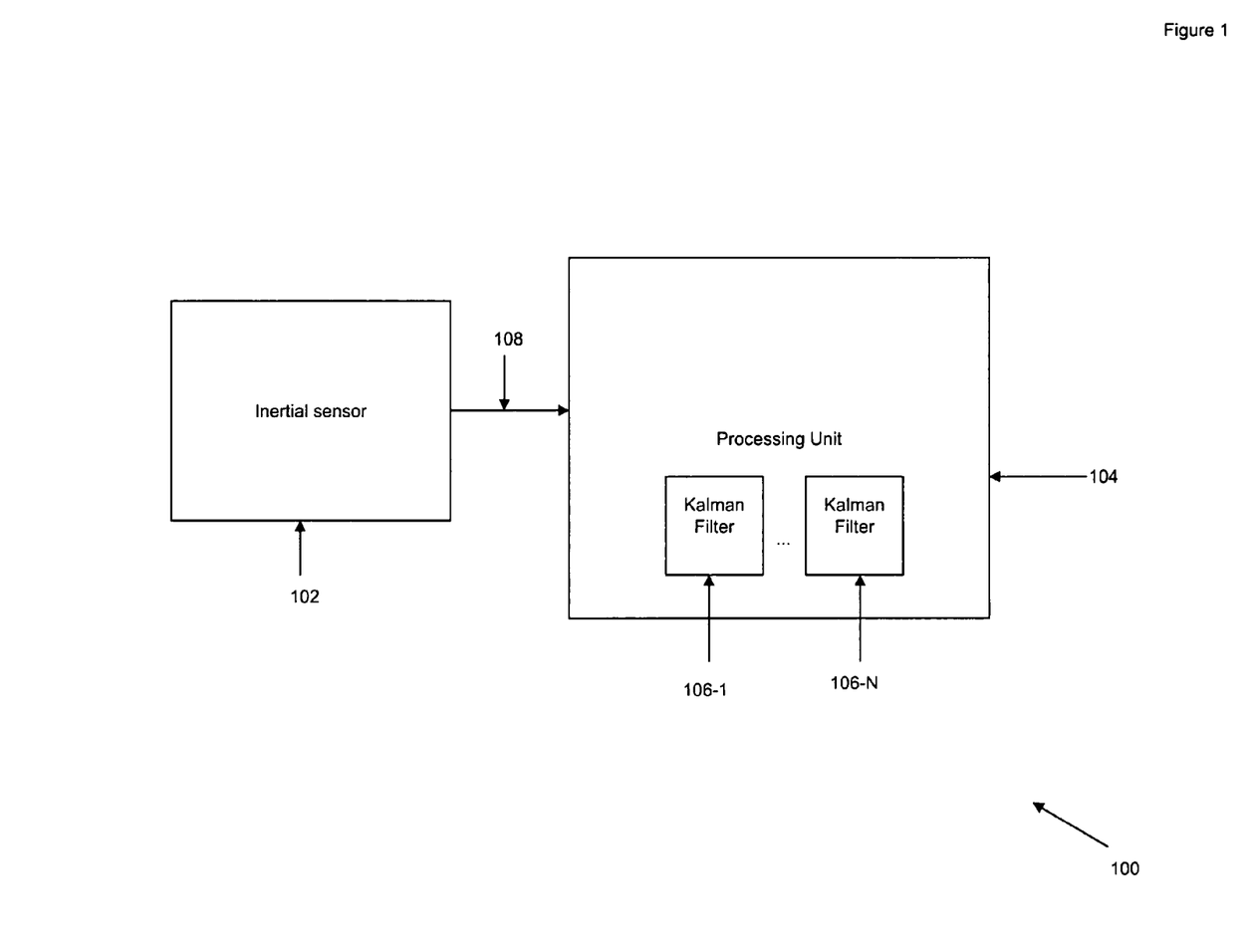
FIG. 1 is an inertial system of one embodiment of the present invention.

FIG. 1 is an inertial system of one embodiment of the present invention shown generally at 100. Inertial system 100 is comprised of inertial sensor 102. In one embodiment, inertial sensor 102 is an accelerometer. In another embodiment, inertial sensor 102 is a gyroscope. In another embodiment, inertial sensor 102 is a plurality of accelerometers or a plurality of gyroscopes or a combination of the two. Inertial sensor 102 is used in civil and military aviation, missiles and other projectiles, submarines and space technology as well as a number of other vehicles. Inertial sensor 102 measures rotational and linear movements without reference to external coordinates. For example, accelerometers measure a change of velocity with respect to an inertial frame. Gyroscopes measure change of rotation with respect to inertial space. Inertial sensor 102 is subject to errors such as vibration and other disturbances.

Inertial sensor 102 communicates with a processing unit 104 via a communication link 108. In one embodiment, communication link 108 is wireless. In another embodiment, communication link 108 is a wired connection. Processing unit 104 includes but is not limited to digital electronic circuitry, a programmable processor (for example, a special-purpose processor or a general-purpose processor such as a computer) firmware, software, or in combinations of them.

Processing unit 104 implements a plurality of Kalman filters 106-1 . . . 106-N. Kalman filters 106-1 . . . 106-N, in general terms, estimate a series of parameters that describe and predict the behavior of a system. The Kalman filters 106-1 . . . 106-N operate with a set of state variables that describe errors in the system and an associated covariance matrix that describes the current knowledge level of the state. The Kalman filters 106-1 . . . 106-N maintain an estimate of the system errors and associated covariance over time and in the presence of external measurements through the use of propagation and updating processes. Kalman filters 106-1 . . . 106-N take the information provided by the inertial sensor 102 and received by the processing unit 104, including the errors created when they are integrated, and provides an estimate of the position, velocity, and attitude of the vehicle.

The accuracy of the position of the inertial system 100 is dependent on the Kalman filters 106-1 . . . 106-N processing zero velocity observations (ZUPTS). ZUPTS are only accurate when the vehicle is stopped. When the vehicle moves, processing an observation to the Kalman filters 106-1 . . . 106-N that assumes the vehicle is stopped causes an error. Detection of motion that allows the system 100 to avoid erroneous ZUPTS often occurs after the motion has started. This detection of motion is performed by the processing unit 104 using a motion detection algorithm. In one embodiment, the motion detection algorithm is a threshold algorithm. In another embodiment, the motion detection algorithm is a solution separation algorithm as described below in FIG. 3. To avoid erroneously processing ZUPTS system 100 maintains a plurality of Kalman filters 106-1 . . . 106-N that have processed zero velocity updates on various cycles.

In one embodiment, Kalman filter 106-1 processes ZUPTS on all the cycles, and Kalman filter 106-N does not process ZUPTS on the last cycle. This allows the processing unit 104 to revert back to Kalman filter 106-N which did not process ZUPTS on the last cycle when motion is detected. This reduces the likelihood that the ZUPTS processed will have errors due to vehicle movement.

In one embodiment, N is equal to two and Kalman filter 106-2 does not process ZUPTS on the last cycle as described above. In another embodiment, N is greater than two and for each additional Kalman filter 106-1 . . . 106-N there is an additional cycle where ZUPTS are not processed. For example, when N is equal to four, Kalman filter 106-1 processes ZUPTS on all cycles, Kalman filter 106-2 does not process ZUPTS on the last cycle, Kalman filter 106-3 does not process ZUPTS on the last two cycles, and Kalman filter 106-4 does not process ZUPTS on the last three cycles. In one embodiment, a cycle is approximately equal to one second. The length of a cycle and the number of Kalman filters 106-1 . . . 106-N are application dependent. One embodiment of a process for preventing erroneous processing of ZUPTS is described with respect to FIG. 2 below.

Figure 2:
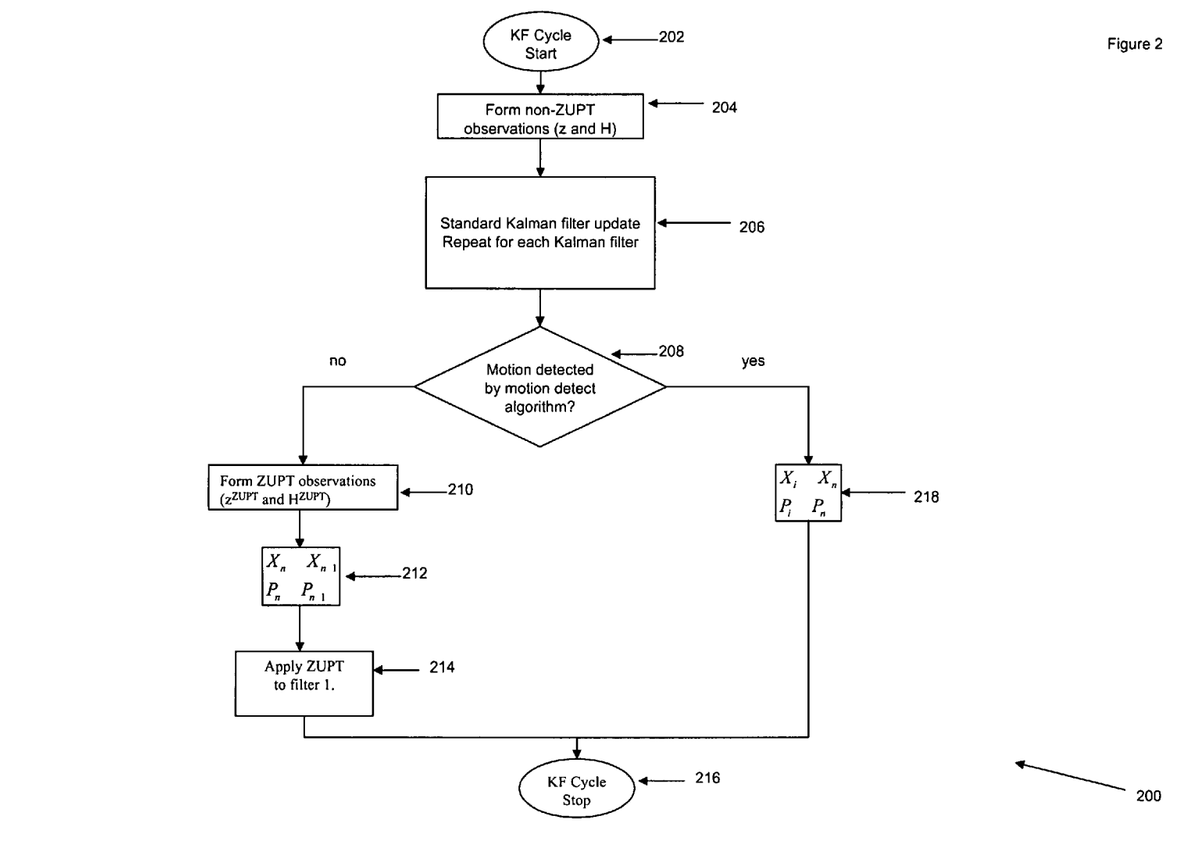
FIG. 2 is a flow chart of one embodiment of a method of the present invention.

FIG. 2 is a flow chart of one embodiment of a method of improving the accuracy of an inertial system shown generally at 200. A plurality of Kalman filters is initialized and the cycle starts (202). A plurality of Kalman filters are used because when a vehicle moves, processing an observation to the Kalman filters that assumes the vehicle is stopped causes an error. Detection of motion that allows the system 200 to avoid erroneous ZUPTS often occurs after the motion has started. Therefore, the method maintains a plurality of Kalman filters that have processed zero velocity updates on various cycles in order to revert back to a Kalman filter that processed zero velocity updates when no motion occurred.

In this embodiment, Kalman filter 1 represents the Kalman filter that processes ZUPTS on all cycles. Kalman filter N represents the Kalman filter that has not processed ZUPTS when motion was occurring. In one embodiment, Kalman filter N did not process ZUPTS on the last cycle. In another embodiment, Kalman filter N did not process ZUPTS on a number of sequential cycles.

The plurality of Kalman filters form non-zero velocity updates (ZUPTS) observations (204). These non-ZUPT observations are for the measurement vector (z) and the measurement sensitivity matrix (H) (204). Each of the plurality of Kalman filters are updated (206). The following list of equations describes this update process.

$$P_i = P_i T + Q$$

$$X_i = X_i$$

$$K_i = P_i H^T [H P_i H^T + R]^{-1}$$

$$P_i = [1 - K_i H] P_i$$

$$X_i = X_i + K_i [z - H X_i]$$

$P_i$ is the covariance of Kalman filter i.

$X_i$ is the error state vector for Kalman filter i.

is the state transition matrix for Kalman filter i.

Q is the process noise for the error states in all Kalman filters.

$K_i$ is the measurement gain matrix for the non-ZUPT observations for Kalman filter i.

H is the measurement sensitivity matrix for the non-ZUPT observations.

z is the measurement vector for the non-ZUPT observations for Kalman filter i.

$K_i^{ZUPT}$ is the measurement gain matrix for the ZUPT observations for Kalman filter i.

$H^{ZUPT}$ is the measurement sensitivity matrix for the ZUPT observations.

$z^{ZUPT}$ is the measurement vector for the ZUPT observations.

The method then determines whether motion has been detected by a motion detect algorithm (208). In one embodiment, the motion detection algorithm uses a threshold to determine if there has been motion. In another embodiment, the motion detection algorithm is a solution separation algorithm as described below in FIG. 3. If no motion is detected, then ZUPT observations are formed ($z^{ZUPT}$ and $H^{ZUPT}$) (210).

If no motion is detected, each Kalman filter copies the covariance and error state vector of the Kalman filter that has processed one more cycle of ZUPTS (212). This process starts with the Kalman filter that has processed the least amount of ZUPTS and ends when the covariance and error state vector for the Kalman filter that processed ZUPTS on the last cycle is copied to the Kalman filter that did not process ZUPTS on the last cycle (212). In one embodiment, the Kalman filter that processed ZUPTS on the last cycle is Kalman filter 1. After the Kalman filters are copied, the zero velocity updates are applied to Kalman filter 1 as demonstrated in the following equations (214).

$$K_1^{ZUPT} = P_1[H^{ZUPT}]^T[[H^{ZUPT}]P_1[H^{ZUPT}]^T + R^{ZUPT}]^{-1}$$

$$P_1 = [I - K_1^{ZUPT}H^{ZUPT}]P_2 \text{ where I is an identity matrix.}$$

$$X_1 = X_1 + K_1^{ZUPT}[z^{ZUPT} - H^{ZUPT}X_1]$$

After the zero velocity updates are applied to Kalman filter 1 the cycle stops (216). If motion was detected, the error state vector and covariance of Kalman filter N is copied to all the Kalman filters because all of the other Kalman filters erroneously processed ZUPTS when the vehicle was in motion (218). After Kalman filter N is copied, the cycle stops (216).

Figure 3:
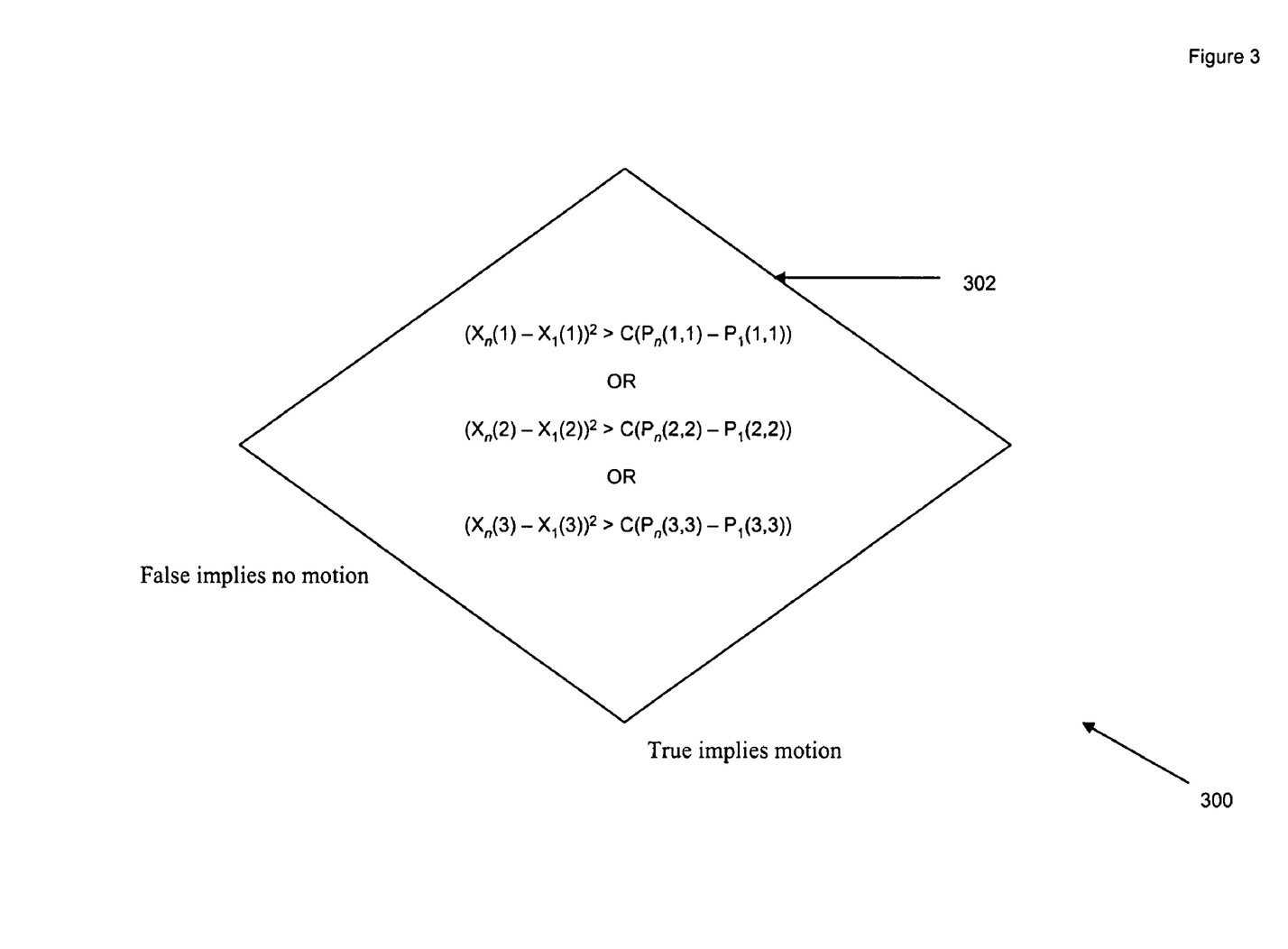
FIG. 3 is a view of one embodiment of a method of the present invention.

FIG. 3 is a view of one embodiment of a method of the present invention shown generally at 300. In this embodiment, a solution separation algorithm 302 is shown. In one embodiment, solution separation algorithm 302 is used to detect motion as shown in block 208 of FIG. 2 rather than using a threshold method. Motion is assumed to have occurred if the position separation between a Kalman filter that assumed no motion and a Kalman filter that assumed motion is greater than the statistically expected separation. In order to understand the solution separation algorithm a listing of definitions is provided.

$P_i(1,1)$ is the first position error covariance of Kalman filter i.

$P_i(2,2)$ is the second position error covariance of Kalman filter i.

$P_i(3,3)$ is the third position error covariance of Kalman filter i.

$X_i(1)$ is the first position error state estimate of Kalman filter i.

$X_i(2)$ is the second position error state estimate of Kalman filter i.

$X_i(3)$ is the third position error state estimate of Kalman filter i.

The solution separation algorithm 302 takes the difference between the first position error state estimate of the $n^{th}$ Kalman filter and the first Kalman filter and squares it. If this number is greater than the difference between the first position error covariance of the $n^{th}$ Kalman filter and the first Kalman filter multipled by C then motion is implied. C is defined as the confidence level required for the test. A value of C greater than one implies a need for uncertainty associated with motion to be greater than one-sigma. This number is application dependent.

The solution separation algorithm 302 then takes the difference between the second position error state estimate of the $n^{th}$ Kalman filter and the first Kalman filter and squares it. If this number is greater than the difference between the second position error covariance of the $n^{th}$ Kalman filter and the first Kalman filter multipled by C then motion is implied.

The solution separation algorithm 302 then takes the difference between the third position error state estimate of the $n^{th}$ Kalman filter and the first Kalman filter and squares it. If this number is greater than the difference between the third position error covariance of the $n^{th}$ Kalman filter and the first Kalman filter multipled by C then motion is implied.

If any of these equations implies motion, zero velocity observations are formed as shown with respect to block 210 of FIG. 2 above. If however, none of these equations implies motion, then Kalman filter N is copied to all Kalman filters as shown with respect to block 218 of FIG. 2 above.

Figure 4:
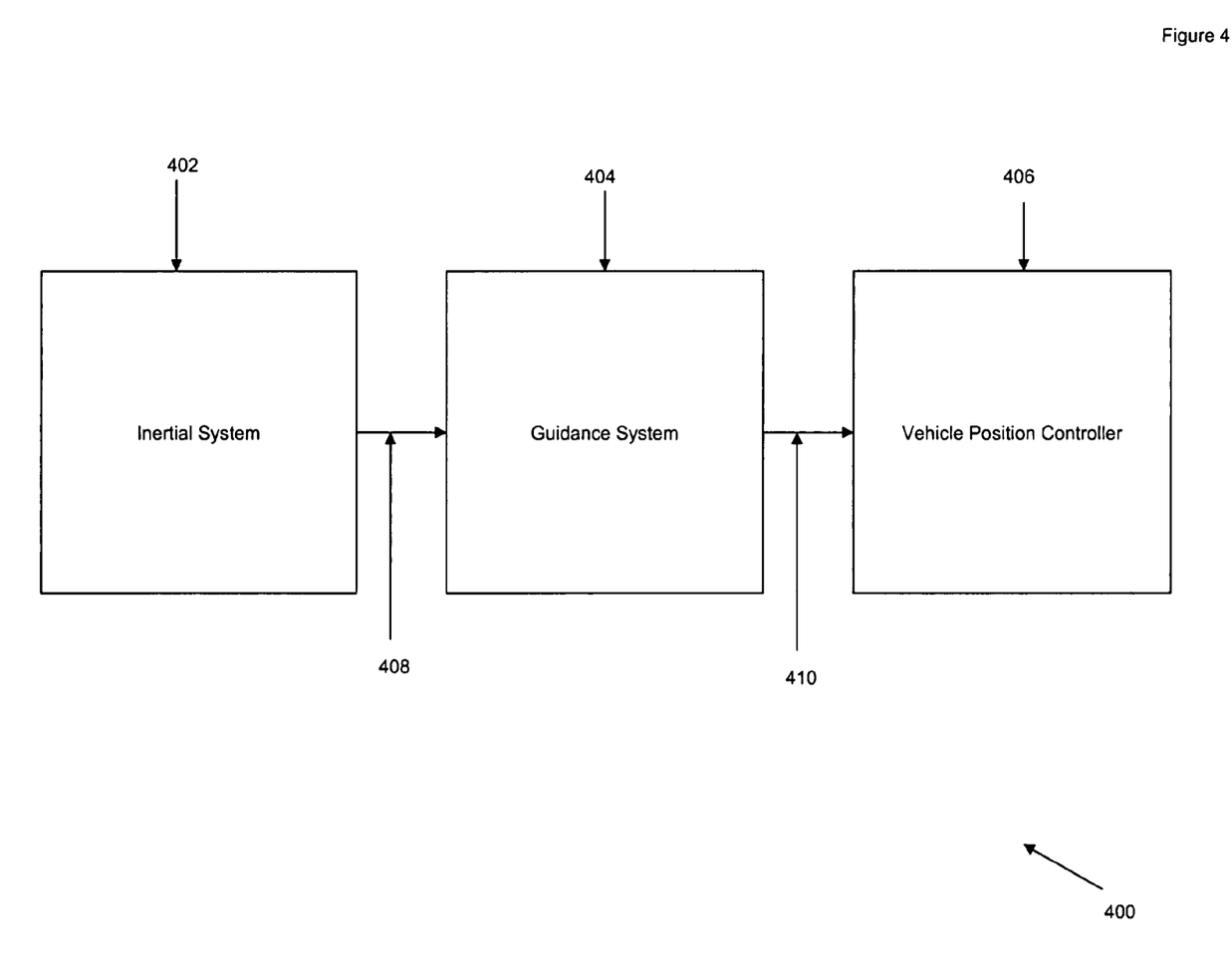
FIG. 4 is a block diagram of a vehicle of one embodiment of the present invention.

FIG. 4 is a block diagram of a vehicle of one embodiment of the present invention shown generally at 400. Vehicle 400 comprises an inertial system 402. Inertial system 402 provides vehicle 400 positioning information. Inertial system 402 uses multiple Kalman filters to enable maintaining a proper output even when ZUPTS are processed when the vehicle is in motion. One example of inertial system 402 is inertial system 100 described above in FIG. 1. Another example of inertial system 402 is inertial navigation system 500 described below in FIG. 5. Inertial system 402 communicates with a guidance system 404 via a communication link 408. In one embodiment, communication link 408 is wireless. In another embodiment, communication link 408 is a wired connection. Guidance system 404 takes information received from inertial system 402 and determines what actions, if any, are necessary to maintain or achieve a proper heading. When guidance system 404 determines a course of action which requires a change in position of vehicle 400, guidance system 404 communicates with a vehicle position controller 406 via a communication link 410. In one embodiment, communication link 410 is wireless. In another embodiment, communication link 410 is a wired connection. Vehicle position controller 406 takes the information received from guidance system 404 and moves vehicle 400 to the appropriate position.

Figure 5:
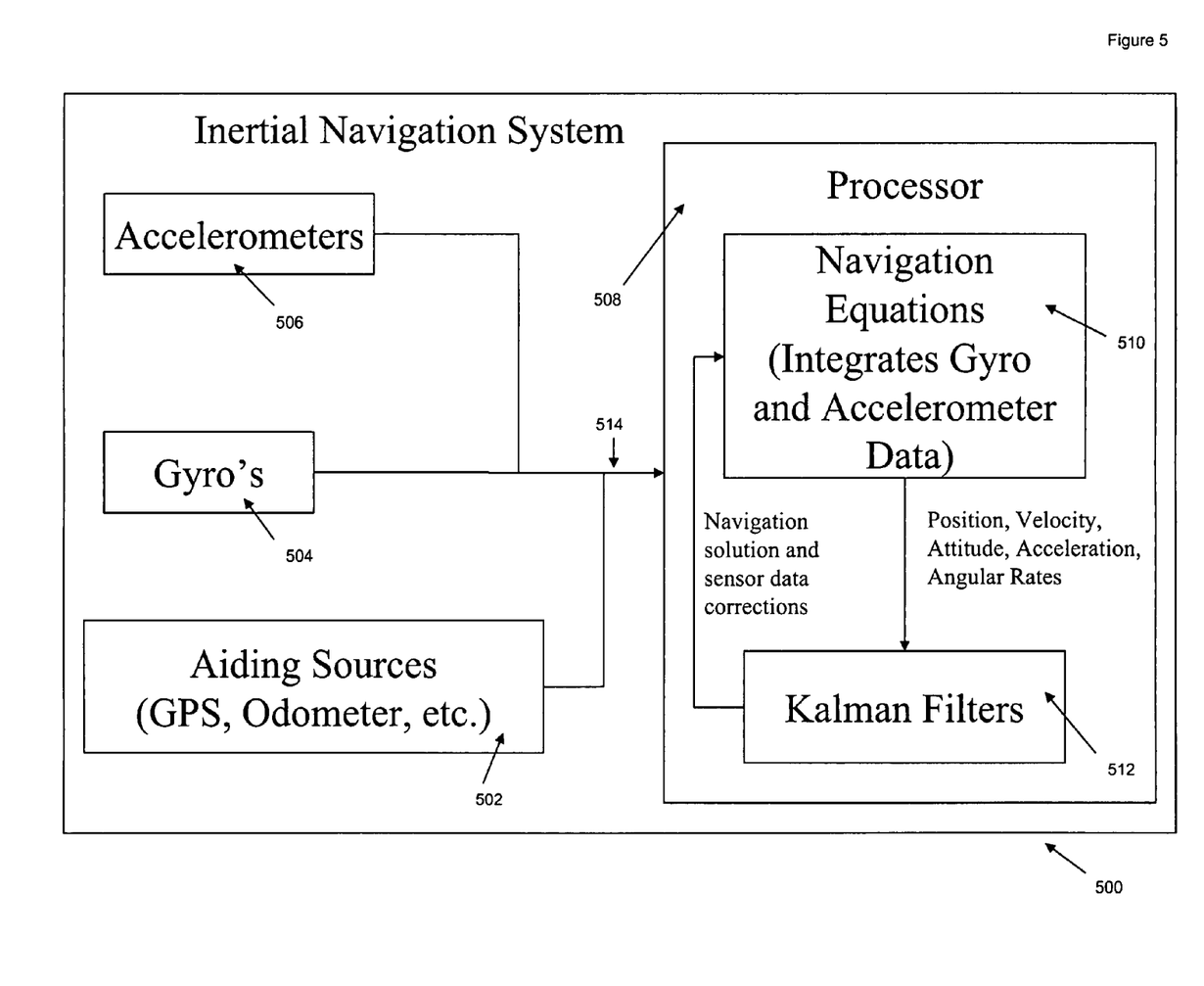
FIG. 5 is an inertial navigation system of one embodiment of the present invention.

FIG. 5 is an inertial navigation system of one embodiment of the present invention shown generally at 500. Inertial navigation system 500 is comprised of a processor 508. Processor 508 includes navigation equations 510 which receive data from sensors and integrates the data before sending it to Kalman filters 512. In one embodiment, the sensors are accelerometers 506. In another embodiment, the sensors are gyroscopes 504. In another embodiment, the sensors are aiding sources 502, including but not limited to, global positioning systems (GPS) and odometers.

Accelerometers 506, gyroscopes 504, and aiding sources 502 communicate with processor 508 via a communication link 514. In one embodiment, communication link 108 is wireless. In another embodiment, communication link 514 is a wired connection. Processor 508 includes but is not limited to digital electronic circuitry, a programmable processor (for example, a special-purpose processor or a general-purpose processor such as a computer) firmware, software, or in combinations of them.

Navigation equations 510 send data, including but not limited to, position, velocity, attitude, acceleration, and angular rates to the Kalman filters 512. Kalman filters 512 receive the data, and after performing calculations, send back to the navigation equations 510 a navigation solution and sensor data corrections.

The accuracy of the data used in inertial navigation system 500 is dependant on processing zero velocity updates (ZUPTS). ZUPTS are only accurate when the vehicle in which the inertial navigation system 500 is located, is stopped. Inertial navigation system 500 uses multiple Kalman filters 512 to enable maintaining a proper output even when ZUPTS are processed when the vehicle is in motion. One example of a method of using multiple Kalman filters 512 to avoid errors due to processing ZUPTS while the vehicle is in motion is described above in FIG. 2.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of generating data in an inertial system, the method comprising:
    processing multiple Kalman filters at a processing unit;
    selecting one of the multiple Kalman filters that did not process zero velocity updates when motion was occurring; and
    copying an error state vector and a covariance of the selected Kalman filter that did not process zero velocity updates when motion was occurring to the other filters.

2. The method of claim 1, wherein processing multiple Kalman filters comprises processing measurements not associated with zero velocity updates.

3. The method of claim 1, wherein processing multiple Kalman filters comprises updating the Kalman filters.

4. The method of claim 1, wherein determining when motion was occurring comprises using a solution separation algorithm.

5. The method of claim 1, wherein determining when motion was occurring comprises taking observations and determining if they exceed a threshold.

6. A method for generating data in an inertial system, the method comprising:
    forming non-zero velocity update observations;
    updating the Kalman filters at a processing unit;
    detecting whether there has been motion;
    forming zero velocity update observations if no motion is detected;
    copying an error state vector and a covariance of the other Kalman filters that have processed one more cycle of zero velocity updates to the Kalman filters that have processed one less cycle of zero velocity updates if no motion is detected;
    applying zero velocity updates to the Kalman filter that processes zero velocity updates on all cycles, when no motion is detected; and
    copying an error state vector and a covariance of the Kalman filter that did not process zero velocity updates when motion was occurring to the Kalman filters when motion is detected.

7. The method of claim 6, wherein copying the error state vector and the covariance of the Kalman filters that have processed one more cycle of zero velocity updates to the Kalman filters that have processed one less cycle of zero velocity updates includes copying the error state vector and the covariance of the Kalman filter that has processed zero velocity updates on the last cycle to the Kalman filter that has not processed zero velocity updates on the last cycle.

8. The method of claim 6, wherein copying the error state vector and the covariance of the Kalman filter that did not process zero velocity updates when motion was occurring to the other Kalman filters comprises copying the error state vector and the covariance of the Kalman filter that did not process zero velocity updates on the last cycle to the Kalman filter that processed zero velocity updates on the last cycle.

9. The method of claim 6, wherein copying the error state vector and the covariance of the Kalman filter that did not process zero velocity updates when motion was occurring to the other Kalman filters comprises copying the error state vector and the covariance of the Kalman filter that did not process zero velocity updates on the last two cycles to the Kalman filter that processed zero velocity updates on the last cycle.

10. The method of claim 6, wherein detecting whether there has been motion comprises using a solution separation algorithm.

11. The method of claim 6, wherein detecting whether there has been motion comprises taking the observations and determining if they exceed a threshold.

12. A non-transitory machine-readable medium having instructions embodied thereon for a method for generating inertial measurement data, the method comprising:
    forming non-zero velocity update observations;
    updating the Kalman filters;
    detecting whether there has been motion;
    forming zero velocity update observations if no motion is detected;
    copying an error state vector and a covariance of the Kalman filters that have processed one more cycle of zero velocity updates to the Kalman filters that have processed one less cycle of zero velocity updates if no motion is detected;
    applying zero velocity updates to the Kalman filter that processes zero velocity updates on all cycles, when no motion is detected; and
    copying an error state vector and a covariance of the Kalman filter that did not process zero velocity updates when motion was occurring to the other Kalman filters when motion is detected.

13. The non-transitory machine-readable medium of claim 12, wherein detecting whether there has been motion comprises using a solution separation algorithm.

14. The non-transitory machine-readable medium of claim 12, wherein detecting whether there has been motion comprises taking the observations and determining if they exceed a threshold.

* * * * *

UNITED STATES PATENT AND TRADEMARK OFFICE
CERTIFICATE OF CORRECTION

| | | |
|---|---|---|
| PATENT NO. | : 7,860,651 B2 | Page 1 of 1 |
| APPLICATION NO. | : 11/215762 | |
| DATED | : December 28, 2010 | |
| INVENTOR(S) | : Morgan et al. | |

It is certified that error appears in the above-identified patent and that said Letters Patent is hereby corrected as shown below:

In the Summary, Column 1, Line 60, delete "To be completed after inventor approval of the claims."

Signed and Sealed this
Twentieth Day of September, 2011

David J. Kappos
*Director of the United States Patent and Trademark Office*